United States Patent [19]
Urzua

[11] Patent Number: 5,860,678
[45] Date of Patent: Jan. 19, 1999

[54] SELF-THREADING JOINING SYSTEM FOR FLEXIBLE OR SEMIRIGID PIPES

[76] Inventor: Melchor Jorge Mittersteiner Urzua, Estado No. 235 OF. 511, Santiago, Chile

[21] Appl. No.: 672,059

[22] Filed: Jun. 26, 1996

[51] Int. Cl.⁶ .................................................. F16L 35/00
[52] U.S. Cl. ............................................. 285/40; 285/251
[58] Field of Search ............................. 285/40, 242, 245, 285/247, 251, 256, 258, 133.4, 130.1, 131.1, 132.1, 133.11

[56] References Cited

U.S. PATENT DOCUMENTS

| | | | |
|---|---|---|---|
| 190,651 | 5/1877 | Webster | 285/133.4 X |
| 786,507 | 4/1905 | Mann . | |
| 2,768,845 | 10/1956 | Samiran | 285/256 X |
| 2,782,059 | 2/1957 | Stranberg | 285/247 |
| 3,140,106 | 7/1964 | Thomas et al. | 285/256 X |
| 5,240,291 | 8/1993 | Zarnow | 285/40 |
| 5,393,104 | 2/1995 | Zarnow | 285/40 |

FOREIGN PATENT DOCUMENTS

| | | | |
|---|---|---|---|
| 279278 | 5/1965 | Australia | 285/258 |
| 363389 | 9/1962 | Switzerland | 285/40 |

*Primary Examiner*—Heather Shackelford
*Attorney, Agent, or Firm*—Shlesinger, Arkwright & Garvey LLP

[57] ABSTRACT

A self-threading joining system for flexible or semi-rigid pipes having two basic elements. The first element or joining end has three zones, the first zone being a hollow stem which outside diameter is slightly greater than the bore of the pipe to be joint; the second zone, which is adjacent to the first one, being a portion of outside thread, which is formed by a widening of the outside diameter of the first zone; said first element ending with the third zone or terminal end, which consists in any known element for networks of flows. The second element is a nut to which said first element or joining end is connected, said nut having three zones: a first zone of single inside thread, which is complementary to the portion of outside thread of the joining end; a second zone or intermediate zone, coaxial and adjacent to said first zone of single thread, consisting in an inside ring-shaped groove, and a third zone, which is coaxial and adjacent to said second intermediate zone, consisting in an inside thread of the die type with a bore enough to produce a thread in the pipe to be joint.

4 Claims, 2 Drawing Sheets

SELF-THREADING JOINING SYSTEM FOR FLEXIBLE OR SEMIRIGID PIPES

FIELD OF THE INVENTION

The present invention relates to a self-threading joining system for flexible or semirigid pipes. More specifically, the present invention consists in joining means preferably manufactured in a synthetic material. A first joining mean consists in a threaded joining end, which is introduced in an end of the pipe, and a nut to which the end of the threaded joining is attached. The nut has two threaded zones, a first zone being of single thread which is connected to the end of the threaded joint, and the second threaded zone is of the die type, which shall produce a thread in the pipe to retain it.

BACKGROUND OF THE INVENTION

A number of systems to join pipes is already known. A first family of these joining systems requires that the pipe has been previously threaded in order to allow the fastening of the joining means. A second family of these joining systems is preferably applied to pipes of soft materials, such as polyethylene (PE), polybutylene (PB), etc., and makes use of the strain capacity of the pipe for it to become compressed in the joining means, but most of these joints do not get a suitable fastening and sealing before high pressures in the network, or before axial displacements of the sections of the pipes. In order to solve this problem, fittings for pipes have been proposed having the means to produce a thread in them in the very operation of installing the fitting. This type of solutions, however, forces the material to be harder than the material of the pipe, and does not ensure a good stability of the joint in case of bendings in the joining zone.

The present invention, on the contrary, allows a pipe joining which is resistant in case of axial displacements or bendings of the pipe, keeping its watertightness characteristics, this avoiding the leakages of flow in the network.

In addition, it allows that one of its components, that is, the threaded joining end, be harder than the pipe, and, as explained below, this ensures more stable and safer joinings of pipes.

SUMMARY OF THE INVENTION

The invention basically consists of two components, the first component being a nut, and the second component being a threaded joining end with and end projection in which the pipe is introduced and to which thread the nut is connected. The nut has two coaxial threaded zones, the first zone being a single thread which is connected to the threaded joining end, and the second threaded zone of the nut being of the die type, which shall produce a thread in the pipe to retain it.

In order to produce the joint according to the invention, the nut first passes through the pipe, which remains loose in the opening of said nut. Then, the joining end with its projection is installed inside one end of the pipe, which diameter is slightly strained. Finally, the nut is adjusted by rotating it around the thread of the joining end. While you are rotating the nut around the joining end, the die-type thread of the nut produces a thread in the strained end portion of the pipe, while radially compressing it against the projection of the joining end, also exerting an axial force against the pipe, and tending to displace it against the threaded portion of said joining end.

According to the invention, the end of the pipe becomes retained between the projection of the joining end and the nut, which threads hold fast the outside surface of the pipe. Due to this kind of fastening, the pipe does not undergo strains in its joint due to possible movements or from the components of the network, such as those produced by vibrations, expansions, contractions or others.

BRIEF DESCRIPTION OF THE DRAWINGS

The present invention shall be described by making reference to a preferred example of execution and based on the drawings, where.

DETAILED DESCRIPTION OF THE INVENTION

Figure 1:
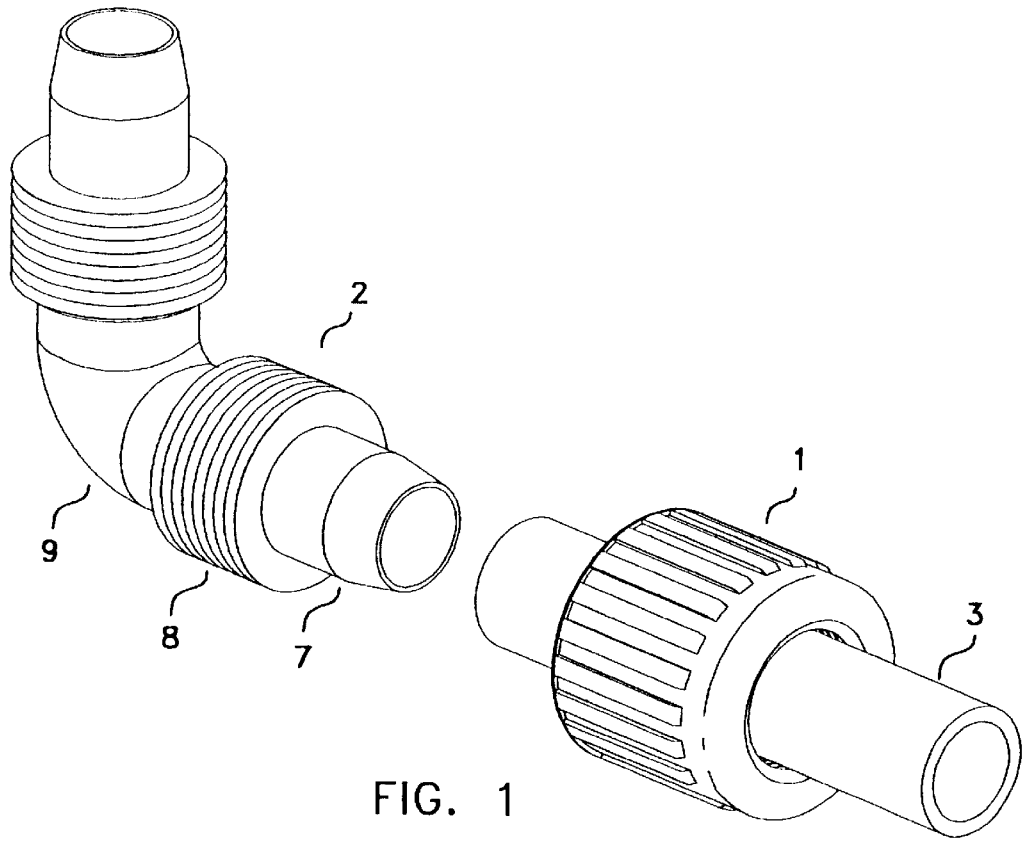
FIG. 1 shows a parallel perspective view of a modality of the joint of the invention in an intermediate installation step.
Figure 2:
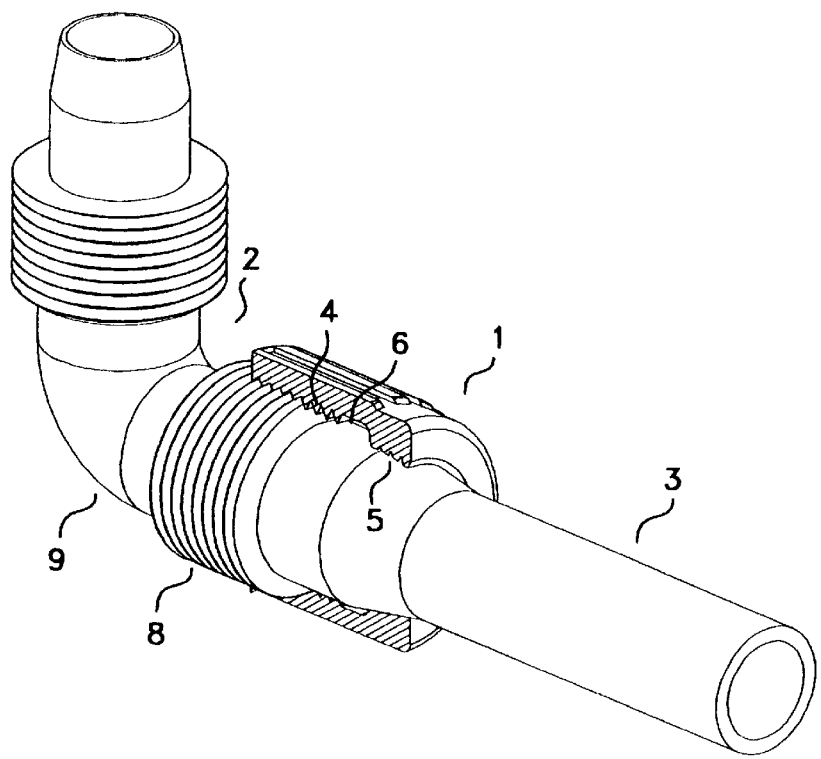
FIG. 2 shows a parallel perspective view of the modality of FIG. 1 with its nut shown in half a section with the joint already executed.

As noted in FIGS. 1 through 6, the invention consists of one nut 1 and one joining end 2, between which a pipe 3 shall be fastened.

The joining end 2 is fully went through by an axial hole for the passing of the flow and its diameter is substantially similar to the bore of the pipe 3. Said joining end 2 is made up of at least three coaxial zones: a first zone or end joining projection 7, followed by a portion of outside thread 8, and finally, a terminal end 9 which may consist in any known element for networks of flows, whether an end joining projection, such as 7 to join another pipe, the body of a valve, the body of an instrument for networks of flows, etc.

The end joining projection 7 of the joining end 2 consists in a hollow stem which outside diameter is slightly greater than the bore of pipe 3, so that when it is connected to said end joining projection 7, the pipe wall 3 becomes widened and tight fit in the projection 7 of the joining end 2.

The portion of outside thread 8 of the joining end 2 consists in a widening of the outside diameter of the end joining projection 7, so that the difference between the diameter of said thread portion 8 and the outside diameter of said end joining projection 7 is equal to or greater than the thickness of pipe 3.

Nut 1 is made up of at least three inner coaxial zones: a first zone of single thread 4, a second thread zone of the die type or threading zone 5, and a third intermediate zone 6 for the leaving out of the steel wool of the pipe when the thread is produced.

The zone of single thread 4 of nut 1 is complementary to the portion of outside thread 8 of the joining end 2.

The bore of the threading zone 5 is slightly greater than the outside diameter of the pipe when the latter is not strained.

The intermediate zone 6 of the nut 1 consists in a ring-shaped groove located between the single thread zone 4 and the threading zone 5, and its purpose is to collect the material which may be detached from the pipe when said threading zone 5 produces the thread in the outside surface of pipe 3.

Figure 3:
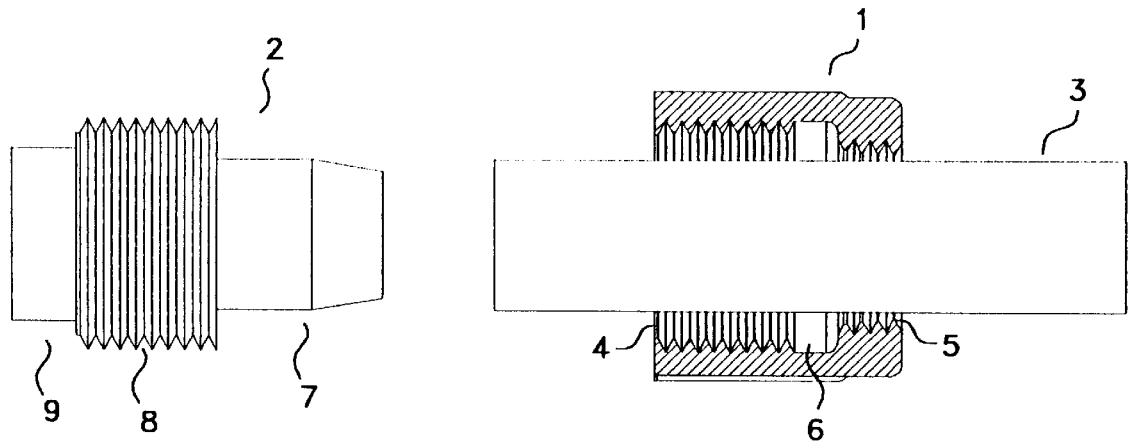
FIG. 3 shows an elevational view with the nut shown in section, in a first stage of installation in a pipe.
Figure 4:
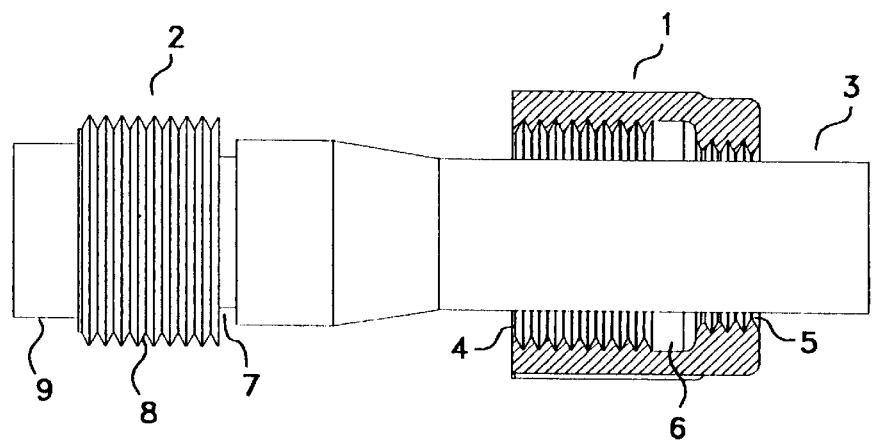
FIG. 4 shows an elevational view of the modality of FIG. 3 with the nut shown in section, in a second stage of installation in a pipe.
Figure 5:
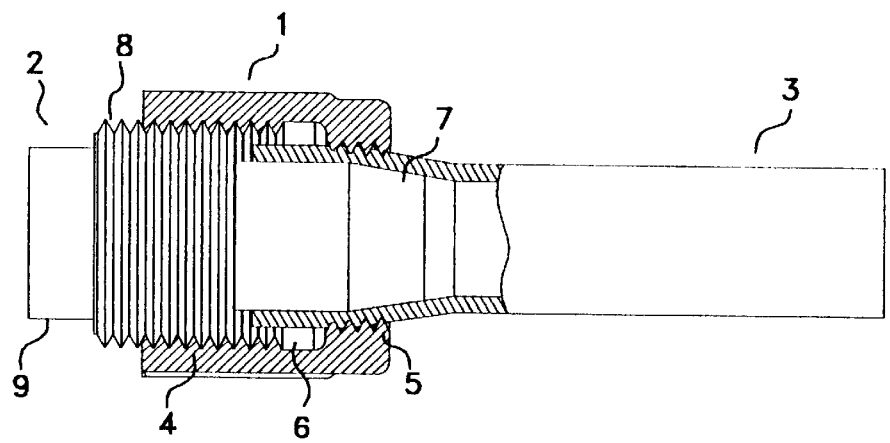
FIG. 5 shows an elevational view of the modality of FIG. 3 with the nut shown in section already installed in a pipe.

As shown in FIG. 3, and in order to produce the joint with the elements of the invention, the nut 1 is slipped in the end of the pipe with the nut oriented with its single thread zone 4 to the terminal end of the pipe. Below, as derived from FIG. 4, the end joining projection 7 of the joining end 2 is forced to enter pipe 3, which end shall be widened, and due to the own elasticity of the pipe, it shall be fit to said end joining projection 7. The next step is to axially slip the nut 1, by making it to rotate if necessary until its zone of single thread 4 faces the portion of outside thread 8 of the joining end 2. In this situation, the threaded zone 5 of nut 1 faces the end portion of the pipe 3, which is widened, and a thread shall begin to be formed in its outside surface, the possible steel wool being collected in the intermediate zone 6 of nut 1. The joint already executed in pipe 3 is shown in FIG. 5.

Some obvious variations of nut 1 shall be considered as a part of them, such as the outside form of nut 1, and in its texture, and the nut can have an hexagonal section of smooth faces to thread the nut with a tool, or it may be of ring-shaped section with its mantle grooved in order to facilitate the tightening of the nut by hand.

Also several obvious executions of the terminal end 9 of the joining end 2 can be considered, which may consist in any known element for networks of flows, whether an end projection of single thread, such as the projection 7, or they may consist in a compound end, such as "L", "T", "Y", or cross joints, in order to join other pipes. Alternatively, the terminal end 9 may consist in the body of a traditional valve, or in the body of an instrument for networks of flows, etc. In addition, the mantle of the end joining projection 7 may have incorporated a plurality of coaxial rings in order to increase the fastening of the pipe in case that nut 1 is loose, whether for maintenance purposes of the network or by unforeseen circumstances.

What is claimed is:

1. A coupling for joining pipes, comprising:

a) a member having an axial hole and first and second end portions;

b) said first end portion for being adapted to be inserted into a pipe to be joined;

c) said first end portion having an outside diameter larger than an inside diameter of the pipe to be joined, thereby to expand the diameter of the pipe when said first end portion is inserted into the pipe;

d) said member including an outside thread disposed adjacent said first end portion, said outside thread having a diameter larger than the diameter of said first end portion and adapted to be at least twice the thickness of the pipe to be joined;

e) said second end portion for being connected to an element of a flow network;

f) a nut including an inside thread complementary to said outside thread; and g) said nut including means for cutting a complementary thread into an outside surface of the pipe to be joined such that said nut collects material released in an inside groove disposed between said inside thread and said cutting means.

2. The system of claim 1, wherein said second end portion is identical to said first end portion.

3. The system of claim 1, wherein said first end portion includes a conical portion to facilitate insertion into the pipe to be joined.

4. The system of claim 1, wherein said groove is annular.

* * * * *